US011212001B1

(12) United States Patent
Catalano et al.

(10) Patent No.: US 11,212,001 B1
(45) Date of Patent: Dec. 28, 2021

(54) TRANSMIT OPTICAL POWER ADJUSTMENT BASED ON RECEIVE OPTICAL POWER MEASUREMENTS

(71) Applicant: International Business Machines Corporation, Armonk, NY (US)

(72) Inventors: Pasquale A. Catalano, Wallkill, NY (US); Christopher J. Colonna, Ossining, NY (US); Mario Borelli, Kingston, NY (US); Faezeh Gholami, Ridgewood, NJ (US); Andrew Gerald Crimmins, Montrose, NY (US); John S. Werner, Fishkill, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/953,498

(22) Filed: Nov. 20, 2020

(51) Int. Cl.
  *H04B 10/00* (2013.01)
  *H04B 10/079* (2013.01)
  *H04B 10/67* (2013.01)
  *H04B 10/564* (2013.01)
  *H04J 14/00* (2006.01)

(52) U.S. Cl.
  CPC ..... *H04B 10/07955* (2013.01); *H04B 10/564* (2013.01); *H04B 10/672* (2013.01)

(58) Field of Classification Search
  CPC .. H04B 10/07955; H04B 10/40; H04B 10/43; H04B 10/50572; H04B 10/564
  See application file for complete search history.

(56) References Cited

U.S. PATENT DOCUMENTS

| 6,359,708 | B1 | 3/2002 | Goel et al. |
| 7,062,177 | B1 | 6/2006 | Grivna et al. |
| 7,581,891 | B2 | 9/2009 | Wang |
| 8,483,580 | B2 | 7/2013 | Miller |
| 8,655,171 | B2 | 2/2014 | Xu et al. |
| 9,660,732 | B2 | 5/2017 | Weisser et al. |
| 9,825,710 | B2 | 11/2017 | Yoo et al. |
| 10,236,995 | B2 | 3/2019 | Featherston et al. |

(Continued)

OTHER PUBLICATIONS

Avago Technologies, "AFBR-710FMZ 10G Fibre Channel, Multimode, 850 nm, SFP+ Optical Transcever", Apr. 17, 2019, pp. 1-19.*

(Continued)

*Primary Examiner* — Daniel G Dobson
(74) *Attorney, Agent, or Firm* — Cantor Colburn LLP; Steven Chiu

(57) ABSTRACT

Aspects include obtaining, by a sending system, a measured receive optical power level of an optical signal that was received at a receiving system coupled to the sending system via an optical network. The optical signal was sent via an optical transmitter of the sending system to an optical receiver of the receiving system. An optimal receive optical power level of the optical receiver of the receiving system is determined by the sending system. The sending system adjusts an output optical power level of the optical transmitter in response to determining that the measured receive optical power level is not within a threshold of the optimal receive optical power level. The adjusting is performed without decoupling the sending system from the receiving system.

24 Claims, 9 Drawing Sheets

(56) References Cited

U.S. PATENT DOCUMENTS

| | | |
|---|---|---|
| 10,298,322 B2 | 5/2019 | Wang et al. |
| 10,536,218 B2 | 1/2020 | Andrekson et al. |
| 10,680,680 B2 | 6/2020 | Hueber et al. |
| 2006/0165417 A1* | 7/2006 | Hsieh .................... H04B 10/40 398/138 |
| 2008/0304824 A1* | 12/2008 | Barbieri ................. H04J 3/14 398/38 |
| 2013/0343751 A1 | 12/2013 | Mamyshev |
| 2019/0081881 A1 | 3/2019 | Ranjal et al. |
| 2020/0112374 A1 | 4/2020 | Rylyakov et al. |
| 2020/0127741 A1 | 4/2020 | Pejkic et al. |

OTHER PUBLICATIONS

Erkilince et al.;"Comparsion Of Low Complexity Coherent REceivers For UDWDM-PONs (λ-To-The-User)",Journal Of Lightwave Technology,vol. 36,No. 16,pp. 3453-3464,Aug. 15, 2016.

Kang et al.; "Optical Receiver Sensitivity Enhancement By . . . Fiber Optical Parametric Amplifier", Optics Express, vol. 25, No. 22, pp. 27785-27794, Oct. 30, 2017.

Perin et al.; "Sensitivity Improvement In 100 Gb/s-per-Wavelength Links . . . Photodiodes", Journal Of Lightwave Technology, vol. 34, No. 23, pp. 5541-5553, Dec. 1, 2016.

Promise et al.; "Simulated Sensitivity Improvement of Optical Receiver In Fiber Optic Network", Advances In Applied Sciences, vol. 3, No. 4, pp. 43-51, Oct. 15, 2018.

Saxena et al.; "Derived Method To Measure Receiver Sensitivity And Receiver Overload For . . . DWDM System", IJERGS journal Of, vol. 3, Iss. 2, pp. 610-616, Mar.-Apr. 2015.

\* cited by examiner

| | | | | | | |
|---|---|---|---|---|---|---|
| IEE584I 14.05.45 DISPLAY M | | FRAME LAST | F | E | SYS=S5A | |
| DEVICE 0D800 STATUS=ONLINE | | | | | | |
| Link Information: Last (Refresh) | | | | | | |
| Description | Channel | Entry Port | | Exit Port | | Cntl Unit |
| Identifier | 01F0 | 2E | | 29 | | 0032 |
| Date Retrieved | 04/08/2016 | 04/08/2016 | | 04/08/2816 | | 04/08/2016 |
| Time Retrieved | 14:05:45 | 14:05:45 | | 14:05:45 | | 14:05:45 |
| Tx Power (dBm) | 0.67 | -0.79 | | 0.35 | | 0.27 |
| Rx Power (dBm) | -0.57 | -0.23 | | -0.08 | | -9.16 |
| Tx Bias (mA) | 39.5 | 51.1 | | 40.2 | | 40.8 |
| Temperature (C) | 34.2 | 55 | | 56 | | 42.8 |
| Voltage (V) | 3.26 | 3.36 | | 3.31 | | 3.32 |
| Capable Speed | 16G | 16G | | 16G | | 16G |
| Operating Speed | 16G | 16G | | 16G | | 16G |
| Buffer Credits | 90 | Not Avail | | Not Avail | | 90 |
| Link Failures | 8 | 24 | | 39 | | 0 |
| Loss of Sync | 11 | 0 | | 0 | | 16 |
| Loss of Signal | 11 | 28 | | 16 | | 14 |
| Primitive Seq Err | 0 | 0 | | 0 | | 0 |
| Invalid Trans Word | 876 | 1005 | | 10021285 | | 172 |
| Inualid CRC | 9 | 464 | | 0 | | 409 |
| FEC Uncorrected | 242 | Not Avail | | Not Avail | | 0 |

FIG. 3

| Link Type | TX Min | TX Max | RX Min | RX Max |
|---|---|---|---|---|
| Multimode FICON LX with MCP | -8.5 dBm | -4 dBm | -22 dBm | -3 dBm |
| Single-mode FICON LX 1 Gbps (100-SM-LC-L) | -9.5 dBm | -3 dBm | -17.3 dBm | -3 dBm |
| Single-mode FICON LX 2 Gbps (200-SM-LC-L) | -11.7 dBm | -3 dBm | -19.5 dBm | -3 dBm |
| Single-mode FICON LX 4 Gbps 10 km (400®-SM-LC-L) | -8.4 dBm | -1 dBm | -16.2 dBm | -1 dBm |
| Single-mode FICON LX 8 Gbps 10 km (800-SM-LC-L) | -8.4 dBm | -1 dBm | -14.8 dBm | -1 dBm |
| Single-mode FICON LX 16 Gbps 10 km (1600-SM-LC-L) | -5.0 dBm | 2 dBm | -11.4 dBm | 2 dBm |
| Single-mode FCP LX 32 Gbps 10 km (3200-SM-LC-L) | -5.0 dBm | 2 dBm | -11.4 dBm | 2 dBm |
| Multimode FICON SX 1 Gbps (100-M5-SN-I 100-M6-SN-I) | -10 dBm | -1 dBm | -14.62 dBm | 0 dBm |
| Multimode FICON SX 2 Gbps (200-M5-SN-I 200-M6-SN-I) | -10 dBm | -1 dBm | -13.31 dBm | 0 dBm |
| Multimode FICON SX 4 Gbps (400-M5-SN-I 400-M6-SN-I) | -9 dBm | -1 dBm | -11.95 dBm | 0 dBm |
| Multimode FICON SX 8 Gbps (800-M5-SN-I 800-M6-SN-I) | -8.2 dBm | -1 dBm | -10.39 dBm | 0 dBm |
| Multimode FICON SX 16 Gbps (1600-M5-SN-I 1600-M6-SN-I) | -7.8 dBm | 0 dBm | -9.75 dBm | 0 dBm |
| Multimode FCP SX 32 Gbps (3200-M5-SN-I 3200-M6-SN-I) | -6.2 dBm | 2 dBm | -10.2 dBm | 2 dBm |
| Single-mode GbE | -11 dBm | -3 dBm | -19 dBm | -3 dBm |
| Single-mode 10GbE LR | -8.2 dBm | 0.5 dBm | -14.4 dBm | 0.5 dBm |
| Multimode GbE | -9.5 dBm | -3 dBm | -17 dBm | -3 dBm |
| Multimode 10 GbE SR (including RoCE) | -7.3 dBm | -1.0 dBm | -9.9 dBm | -1.0 dBm |
| Multimode 25 GbE SR | -8.4 dBm | 2.4 dBm | -10.3 dBm | 3 dBm |
| Coupling Express LR (CE LR) | -8.2 dBm | 0.5 dBm | -14.4 dBm | 0.5 dBm |
| Integrated Coupling Adapter (TCA SR) | -7.6 dBm | 2.4 dBm | -9.5 dBm | 2.4 dBm |
| zHyperLink Express | -7.6 dBm | 2.4 dBm | -9.5 dBm | 2.4 dBm |

FIG. 4

TRANSMIT OPTICAL POWER ADJUSTMENT BASED ON RECEIVE OPTICAL POWER MEASUREMENTS

BACKGROUND

The present invention generally relates to computer processing, and more specifically, to transmit optical power adjustment based on receive optical power measurements.

Contemporary optic transceivers transmit data at a fixed optical power measured, for example, in milliwatts (dBm). There are mechanisms built into the optical devices that are used to adjust (increase or decrease) the transmit optical power of the optical transceivers based on manufacturer settings. These mechanisms are currently not accessible from the system level. This inability to adjust the transmit optical power of a transmitter in an optical transceiver while the system is operating can result in system inefficiencies due, for example, to the transmit optical power level not being at an optical power level that is optimal for a current operating environment of an optical network.

The link budget for each port in an optical network may be vastly different from neighboring ports based on a number of factors such as how the fiber is run, the number of patch panels and jumper cables, and the destination. A link budget is an accounting of all of the power gains and losses that a communication signal experiences in a telecommunication system; from a transmitter, through a medium (free space, cable, waveguide, fiber, etc.) to the receiver. The link budget can be calculated using an equation giving the received optical power from the transmitter optical power, after the attenuation of the transmitted signal due to propagation, as well as the antenna gains and feedline and other losses, and amplification of the signal in the receiver or any repeaters it passes through. A link budget is a design aid, calculated during the design of a communication system to determine the received optical power, to ensure that the information is received intelligibly with an adequate signal-to-noise ratio.

The link budget may be impacted due to many factors such as the age of the fiber plant, contamination, distance of fiber runs, optical splices, and insertion loss. Over time, adjustments to the transmit optical power levels may be needed to compensate for poor fiber hygiene. Optics that transmit at higher optical power levels than those required consume more electric power and run hotter and may require more cooling. In contrast, optics that transmit at lower optical power levels than those required can result in the correct data not being received at the receiving end due to bit errors.

There are tools available to determine a received signal strength at an optical receiver of an optical transceiver. One such tool is a Read Diagnostic Parameters (RDP) Extended Link Service (ELS) function that is part of the T11-Fibre Channel standard, FC-LS (Link Services). The RDP function can be used in an optical network to enhance path evaluation and automatically differentiate between cable hygiene errors and failing components. The RDP function provides the optical characteristics of each end of a link, including optical signal strength and environmental operating metrics, without requiring manual insertion of optical measurement devices.

The RDP function, as implemented in z/OS® by IBM®, includes a LINKINFO parameter that offers four ways to display link diagnostic information for a device and channel path identifier (CHPID). The diagnostic information includes the optical transceiver values, error counters, operating and capable speed, and buffer credits for each port in the path. For switched configurations, information for the channel port, entry switch port, exit switch port, and control unit port are displayed. For point-to-point configurations, information for the channel port and control unit port are displayed. This detailed link diagnostic information is used by system service representatives to help them in quickly identifying any potential problem areas.

SUMMARY

Embodiments of the present invention are directed to transmit optical power adjustment based on receive optical power measurements. A non-limiting example computer-implemented method includes obtaining, by a sending system, a measured receive optical power level of an optical signal that was received at a receiving system coupled to the sending system via an optical network. The optical signal was sent via an optical transmitter of the sending system to an optical receiver of the receiving system. An optimal receive optical power level of the optical receiver of the receiving system is determined by the sending system. The sending system adjusts an output optical power level of the optical transmitter in response to determining that the measured receive optical power level is not within a threshold of the optimal receive optical power level. The adjusting is performed without decoupling the sending system from the receiving system.

One or more embodiments of the present invention are directed to a system for transmit optical power adjustment based on receive optical power measurements. A non-limiting example of the system includes a memory having computer-readable instructions and one or more processors for executing the computer-readable instructions. The computer-readable instructions may implement the above method.

One or more embodiments of the present invention are directed to a computer-program product for, the computer-program product including a computer-readable storage medium having program instructions embodied therewith. The program instructions are executable by a processor to cause the processor to perform the above method.

Thus, advantageously, one or more embodiments of the present invention allow the transmit optical power of an optical transceiver to be adjusted while the system is operating. This can allow the optical devices to operate at the optimum levels based on the current (real-time or near real-time) operating environment which can lead to reduced costs to power and to cool the optical devices, and more consistent performance of the optical devices.

Additionally, or alternatively to the above, the adjusting causes a next received optical power level of a next signal received at the receiving system to be within the specified range of the optimal receive optical power level. Thus advantageously, a signal at an optimal power level for the current operating environment can be sent to the receiving system.

Additionally, or alternatively to the above, the measured receive optical power level is obtained from the receiving system. Thus, advantageously, the measured receive optical power level reflects the actual optical power level of the signal received at the receiving system.

Additionally, or alternatively to the above, the sending system sends a request to the receiving system for the measured receive optical power level and the obtaining is responsive to the request. Thus, advantageously, the measured receive optical power level reflects the actual optical power level of the signal received at the receiving system.

Additionally, or alternatively to the above, a read diagnostic parameter (RDP) function is utilized to obtain the measured receive optical power level. Thus, advantageously, a function that is part of the T11-Fibre Channel standard is used to obtain the optical power level of the signal received at the receiving system.

Additionally, or alternatively to the above, a port to couple the sending system to the receiving system via the optical network is activated and the obtaining is in response to the activating. Thus, advantageously, the measured receive optical power level reflects the actual optical power level of the signal received at the receiving system for the current operating environment port activation.

Additionally, or alternatively to the obtaining and determining are repeated periodically. Thus advantageously, the optical power level can be adjusted based on a current operating environment.

Additionally, or alternatively to the above, the adjusting comprises increasing or decreasing the output optical power. Thus advantageously, the optical power level can be adjusted based on a current operating environment.

Additionally, or alternatively to the above, the optimal receive optical power level is specified in a document provided by a manufacturer of the optical receiver. Thus advantageously, the optical power level can be adjusted based on a current operating environment.

Additionally, or alternatively to the above, the adjusting is via an application programming interface (API) of the optical transmitter. Thus, advantageously, the optical transmitter can be adjusted automatically and without human intervention.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts an example of diagnostic information that may be utilized to perform transmit optical power adjustment based on receive optical power measurements according to one or more embodiments of the present invention;

FIG. 4 depicts an example of an optical power specification table that may be utilized to perform transmit optical power adjustment based on receive optical power measurements according to one or more embodiments of the present invention;

Figure 1:
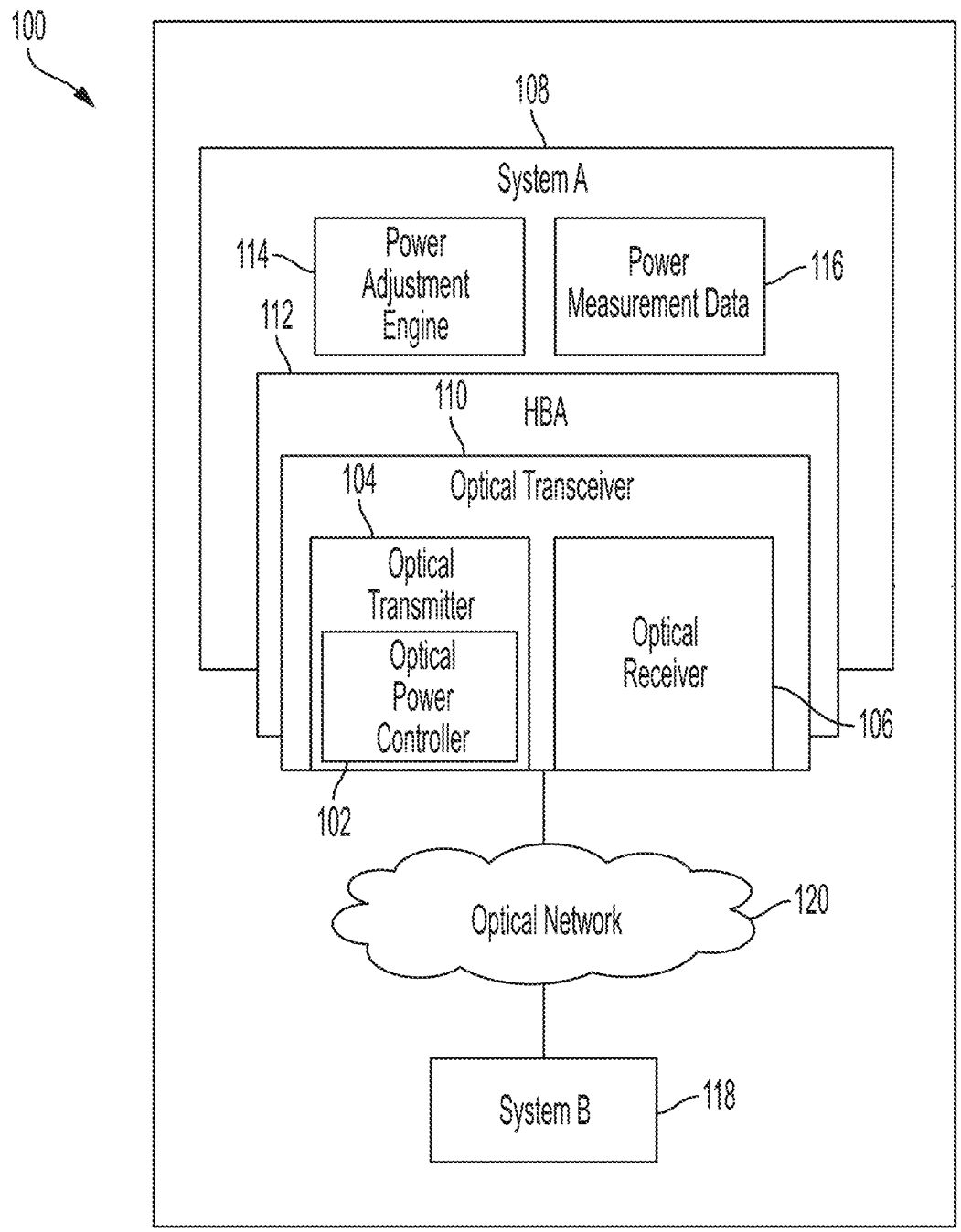
FIG. 1 depicts a block diagram of a configuration for performing transmit optical power adjustment based on receive optical power measurements according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide transmit optical power adjustment based on the measured optical power of a signal that is received at a receiver of an optical transceiver. In accordance with one or more embodiments of the present invention, a local port transmits a signal to a neighbor port in an optical network and a received optical power level of the signal is measured at the neighbor port. The measured receive optical power level is compared to an optimum receive optical power level of the neighbor port. Based on there being more than a specified amount of difference between the measured receive optical power level and the optimum receive optical power level, the transmit optical power of the local port is adjusted to get them more closely aligned.

In accordance with one or more embodiments of the present invention, after link initialization, a Read Diagnostic Parameter (RDP) function is used to read the receive optical power and operating link speed of a transceiver in a link path of an optical network. In accordance with one or more embodiments of the present invention, an optical power specification is accessed to look up an input optical power sensitivity range, or the receiver eye target, of the transceiver and to determine the optimal receive optical power level, or optimum input optical power, of the current operating mode (e.g. protocol, data rate) of the transceiver. The output optical power level, or transmit optical power level, of the transmitter sending signals to the transceiver is adjusted (increased or decreased) based on the difference between the optical power readings from the RDP and the optimum input optical power of the transceiver. In accordance with one or more embodiments of the present invention, the optimum input optical power includes a range of optical power levels that are within the sensitivity range specified by the optical power specifications.

In contemporary systems, the output optical power of an optical transceiver is fixed once the transceiver is powered up and connected to the optical network. Contemporary optical transceivers do not allow for the adjustment of the transmit optical power while the system is operating. This inability to adjust the transmit optical power of an optical transceiver while the system is operating can result in system inefficiencies due, for example, to the transmit optical power level not being at an optical power level that is optimal for a current operating environment of an optical network. For example, over time, cable hygiene errors such as dirt or debris or damage to the fiber optic cable connectors may cause changes to the optical power level of signals received by a transceiver and adjustments may be desired, and in some cases required, to compensate for these differences. Another factor that can affect power levels is the operating time of the optical transceivers. Aging optics can transmit lower power levels than were initial configured by the manufacturer. As described previously, optics that transmit at higher optical power levels than those required consume more electric power and run hotter and therefore may require more cooling. In contrast, optics that transmit at lower optical power levels than those required can result in the correct data not being received at the receiving end.

One or more embodiments of the present invention address one or more of the above noted shortcoming of contemporary systems by allowing the transmit optical power of an optical transceiver to be adjusted while the system is operating, that is after a link between a local node and a neighbor node has been initialized. In accordance with one or more embodiments of the present invention, link initialization is complete after the optical transceivers at the local and neighbor nodes have been powered up and coupled to each other to communicate via an optical network. This ability for the local node to adjust its transmission optical power after link initialization based on an optical power level measured at the receiving node allows optical devices to operate at the optimum levels and not at a higher level than required will save on costs to power, and possibly to cool, the optical devices. Boosting the transmission optical power levels to neighbor nodes that are getting close to the lower end of the receiver target eye before they actually dip below the range can result in avoiding performance impacts (e.g., due to error correction activities) and/or system outages caused by erroneous data being received. Similarly, reducing the transmission optical power levels to neighbor nodes that are getting close to the higher end of the receiver target eye before they actually go above the range can also avoid performance impacts and/or system outages caused by erroneous data being received.

Turning now to FIG. 1, a block diagram 100 of a configuration that performs transmit optical power adjustment based on receive optical power measurements is generally shown in accordance with one or more embodiments of the present invention. The components shown in FIG. 1 include system 108, optical network 120, and system 118. In accordance with one or more embodiments of the present invention, optical network 120 can include, but is not limited to fiber optic cables, connectors, and/or patch panels.

As shown in FIG. 1, system 118 includes a host bus adapter (HBA) 112 and an optical transceiver 110. In accordance with one or more embodiments of the present invention, system 108 is a device that includes a central processing unit (CPU) and memory (not shown) that connects to optical network 120. The system 108 can be implemented by, but is not limited to, an IBM Z®, a direct access storage device (DASD), a tape device, a storage area network (SAN) switch, and/or a dense wavelength division multiplexing (DWDM) device. HBA 112 is an example of an input/output (I/O) card that can be utilized by embodiments of the present invention to talk northward to the CPU of system 108. This communication can occur, for example, via a peripheral component interconnect express (PCIe) interface. The HBA 112 converts the data received from the CPU of system 108 into a desired protocol and transmits it southward to optical network 120.

As shown in FIG. 1, HBA 112 is coupled to optical transceiver 110 which can be implemented by a fixed or by a pluggable optical component. The optical transceiver 110 includes an optical transmitter 104 for transmitting optical signals and an optical receiver 106 for receiving optical signals. The optical transmitter 104 shown in FIG. 1 includes an optical power controller 102 for adjusting the transmission optical power of the optical transmitter 104. In accordance with one or more embodiments of the present invention, the optical power controller 102 adjusts the transmission optical power in response to a command received via an application programming interface (API) interface. In accordance with one or more embodiments of the present invention, a microcontroller (MCU), an electrically erasable programmable read-only memory (EEPROM), and an integrated laser driver is implemented inside the optical transceiver 110. The optical power level can be adjusted by varying the laser bias controlled by the integrated laser driver controller. The driver controller settings are setup by the MCU which is connected through an i2c bus to the EEPROM which maintains the setting for the driver. With write access to the EEPROM registers, the API can change the register values to adjust the power through i2c bus.

As shown in FIG. 1, system 108 includes a power adjustment engine 114 and power measurement data 116. In accordance with one or more embodiments of the present invention, the power adjustment engine 114 includes computer instructions for monitoring the measured receive optical power level of one or more neighbor nodes (as measured at the optical receiver of each of the neighbor nodes) and instructs the optical power controller 102 to increase or decrease the output optical power level based on an assessment of how much the measured optical power level deviates from an optimal optical power level (or range of power levels). In accordance with one more embodiment of the present invention, the measured received optical power level of a neighbor node is obtained in response to a command issued by the system 108 requesting the measurement data from the neighbor node. An example of such a command is an RDP command as described below. Other methods of obtaining measurement data include but are not limited to: receiving optical power measurement data sent from a Storage Area Network (SAN) device using a Control Unit Port (CUP); receiving optical measurement data from an in-line measurement device, such as an optical spectrum analyzer; analyzing data from an optical time domain reflectometer (OTDR) device to determine available link budget; and the device of the neighbor node transmitting their optical receive power level through an API such an CIMOM or SNMP.

In one or more embodiments of the present invention, the measurement data can be collected for all, or for a selected subset of the nodes coupled to the optical network 120 on a periodic basis and not in response to a specific request for the data. The data can also be collected based on an event, such as a new switch being added to the optical network 120, the I/O channel going through an error recovery event, or a cable being replaced.

In accordance with one or more embodiments of the present invention, the power measurement data 116 includes the measured receive optical power levels of any neighbor nodes in the optical network having links to the system 108, or the local node. In addition, the power measurement data 116 can include the optical power specifications, such as those shown in FIG. 4 below, for the various optical transceivers, including the optical transceiver 110 at the local node (e.g., system 108) and the optical transceiver(s) at the neighbor node(s).

In accordance with one or more embodiments of the present invention, the HBA 112 and optical transceiver 110 are located external to the system 108 and not integrated into the system 108 as shown in FIG. 1. Though not shown, one or more embodiments of system 118 includes the same components as system 108 operating in the same manner as described herein with respect to system 108.

For ease of description, FIG. 1 shows a single local node (e.g., system 108) and a single neighbor node (e.g., system 118). One skilled in the art will recognize that one or more embodiments of the invention are not limited to two nodes and that any number of local and neighbor nodes may be implemented by one more embodiments of the present invention. In addition, one or both of system 108 and system 118 may operate as both a local node and a neighbor node. For example, measured receive power level of optical receiver 106 may be obtained and sent to system 118 for adjusting the transmit power level of an optical transceiver located on system 118. In this example, system 118 is the local node sending data to system 108 which is the neighbor node.

In accordance with one or more embodiments of the present invention, the local node and the neighbor node may be located on the same system (e.g., both may be located on system 108). This configuration can be used for example, by coupling and FICON Channel-to-Channel (CTC) which allow for ports on the same system to connect together.

Figure 7:
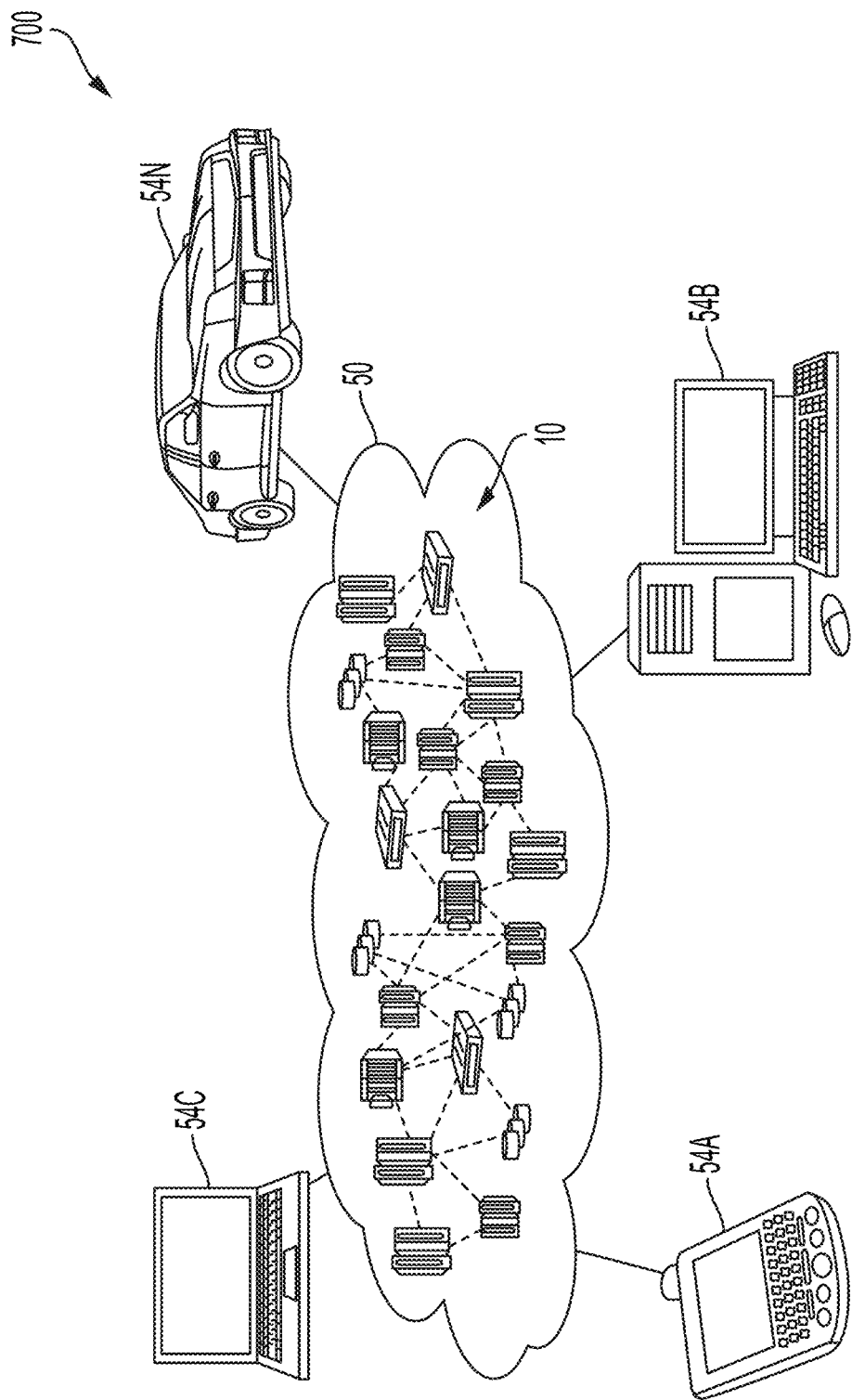
FIG. 7 depicts a cloud computing environment according to one or more embodiments of the present invention.
Figure 9:
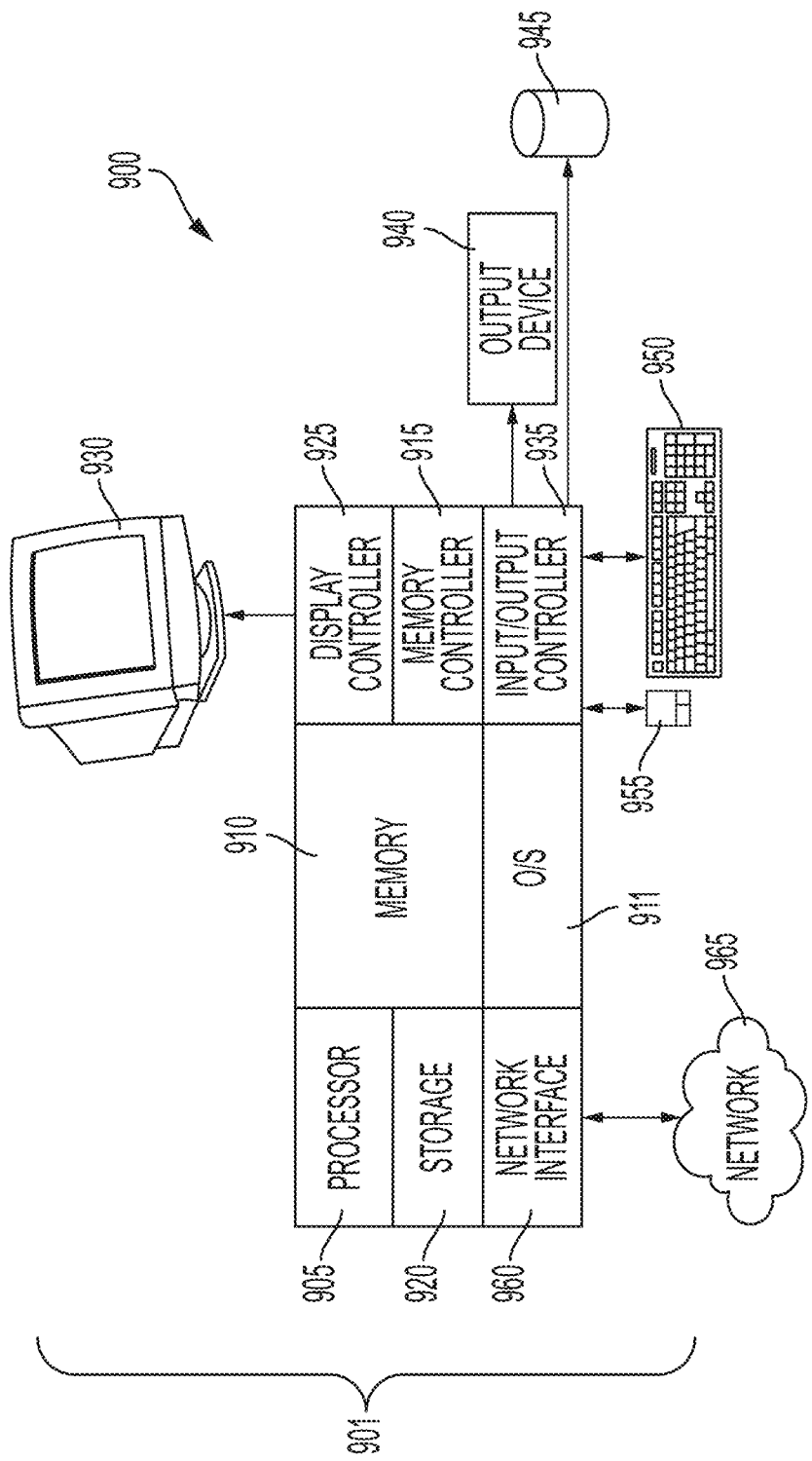
FIG. 9 illustrates a system for performing transmit optical power adjustment based on receive optical power measurements according to one or more embodiments of the present invention.

In accordance with one or more embodiments of the present invention, all or portions of one or both of system 108 and system 118 are implemented by at least a portion of computer 901 of FIG. 9 and/or by a node located on a cloud computing node 10 of FIG. 7.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
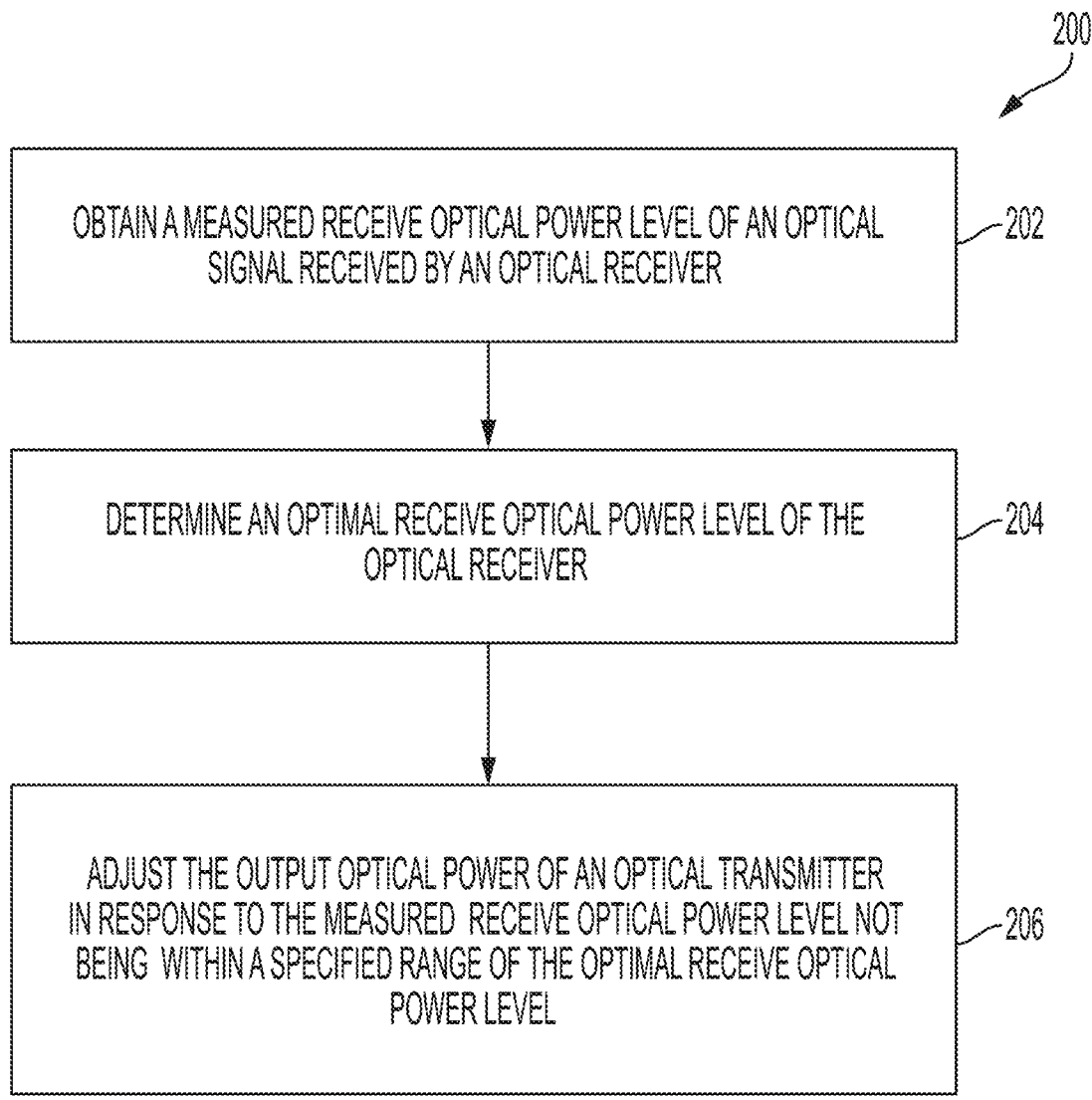
FIG. 2 depicts a flow diagram of a method for performing optical power adjustment based on receive optical power measurements according to one or more embodiments of the present invention.

Turning now to FIG. 2, a flow diagram of a method 200 for performing optical power adjustment based on receive optical power measurements is generally shown in accordance with one or more embodiments of the present invention. All or a portion of the processing shown in FIG. 2 can be performed, for example, by power adjustment engine 114 and optical power controller 102 of FIG. 1 operating on system 108 and/or system 118 of FIG. 1.

At block 202, a measured receive optical power level of an optical signal received by an optical receiver is obtained. In accordance with one or more embodiments of the present invention, the optical signal being measured is received at a receiver, or transceiver, of a receiving system. The signal is received from a transmitter, or transceiver, of a sending system via an optical network such as optical network 120 of FIG. 1. In accordance with one or more embodiments of the present invention, the sending system and receiving system are linked, or coupled together, via the optical network. The measured receive optical power level that is obtained can be stored, for example, in power measurement data 116 of FIG. 1.

At block 204 of FIG. 2, an optimal receive optical power level of the optical receiver of the receiving system is determined based, for example on product specifications that are stored, for example, in power measurement data 116 of FIG. 1. The specifications can include a minimum receive optical power level and a maximum receive optical power level for the optical receiver, with the power levels varying depend on operating environment factors such as the protocol being used, the speed of the link, and the mode (e.g., single-mode, multimode). An example of a specification that can be utilized by one or more embodiments of the present invention is described below and shown in FIG. 4.

The output optical power level of the optical transmitter that sent the signal is adjusted at block 206 if the measured receive optical power level is not within a specified range of the optimal receive optical power level. The adjusting is performed without decoupling the sending system from the receiving system. Performing the adjusting while the system is operational avoids the need to reinitialize or reactive the link between the receiving system and the sending system in order for the change to take place In accordance with one or more embodiments of the present invention, the goal of the adjusting is to have the receive optical power level at the optical receiver being within the range of the minimum receive optical power level and the maximum receive optical power level for the optical receiver. The maximum and minimum power levels are determined based on the current operating environment of the optical receiver. The adjusting can aim for the receive optical power level to be in the center of the minimum and maximum values. In this example, the optimal receive optical power level can be the eye, or center, of the minimum and maximum receive optical power levels, and the threshold can be set to a value that keeps the optical power of the received signals close to the center value (e.g., 0 dBm, 1 dBm, 2 dBm, etc.) or the threshold may be set to allow more leeway (e.g., 4 dBm, 4.5 dBm).

Alternatively, the adjusting can aim for the receive optical power to be closer to the minimum value which may save on electric power. In this case, being within the threshold value may refer to the measured receive optical power not being over the optimal receive optical power level by more than a value (e.g., 3 dBm, 4 dBm) and not being under by a more than a second value e.g., 0 dBm, 0.5 dBm, 1 dBm) to keep the receive optical power level on the lower side of the range.

The adjusting can take previous measured receive optical power levels into account. For example, if the history of the measured values indicates that the receive optical power level is increasing between measurements, the adjusting can aim for a receive optical power level that is closer to the minimum value. In addition, the adjusting can be performed incrementally, repeating the measuring and adjusting of the transmit power at the transmitter until the desired value of the receive optical power is achieved.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Turning now FIG. 3, an example of diagnostic information 300 obtained from RDP that may be utilized to perform transmit optical power adjustment based on receive optical power measurements is generally shown in accordance with one or more embodiments of the present invention. The diagnostic information 300 shown in FIG. 3 can be generated by issuing an RDP refresh command such as "DM=DEV(D800,(94)),LINKINFO=REFRESH" to request that the system obtain new link diagnostic information for the physical path. The RDP refresh command returns the information 300 shown in FIG. 3 which can be displayed and/or stored, for example in power measurement data 116 of FIG. 1.

As shown in FIG. 3, the local node is a channel with port identifier 01F0 that is connected to a neighbor node of a switch at the entry port of 2E. The RDP data also shows that the operating speed of the link is 16 Gbps. It can be determined from the configuration data (not shown) that this link is defined as using the FICON protocol and uses the LX optic type. Based on this information, it can be determined from FIG. 4, that the receive sensitivity range for this operating mode (Single-mode FICON LX 16 Gbps) is +2 dBm to −11.4 dBm. The optimal optical sensitivity is directly in the middle of the Tx Max and Tx Min values, in this case that is −4.7 dBm. Now back to FIG. 3, it can be seen that the measure Rx Power at Entry Port 2E is −0.23 dBm. In this case, the Rx Power at 2E is approximately (−0.23 dBm−(−4.7 sBm)) 4.5 dBm too high. Using the method described the Tx Power of the local node (01F0) can be reduced from 0.67 dBm, down to −3.83 dBm.

The RDP refresh operation can be performed periodically to proactively detect marginal conditions that can be addressed before they impact production operations.

Turning now to FIG. 4, an example of an optical power specification table 400 that may be utilized to perform transmit optical power adjustment is generally shown in accordance with one or more embodiments of the present invention. All or as subset of the optical power specification table 400 shown in FIG. 4 can be stored in power measurement data 116 of FIG. 1. In accordance with one or more embodiments of the present invention, the information shown in the table 400 of FIG. 4 is received from a manufacturer of a server, such as system 108 of FIG. 1, and used by service representatives in performing initialization, isolation, and repair actions on the server. As shown in table 400, for a link type of "Single-mode FICON LX 16 Gbps 10 km (1600-SM-LC-U}" the transmit optical power minimum is −5.0 dBm, the transmit optical power maximum is +2 dBm, the receive optical power RX minimum is −11.4 dBm, and the receive optical power maximum is +2 dBm.

In contemporary implementations, the optical receive power of a transceiver to be coupled to this type of link is set (prior to being connected to the link) to the center of this range, or −4.7 to allow for the power level to vary during operation. The initial setting of the power levels can be performed during the manufacturing process of the optical transceiver to ensure that it operates within the minimum and maximum ranges shown in FIG. 4 when they are first installed. In accordance with one or more embodiments of the present invention, the initial setting of the receive optical power can be closer to the lower end of the range to save electrical power because the receive optical power level can be monitored and the transmit optic power can be adjusted during system operation based on results of the monitoring.

Figure 5:
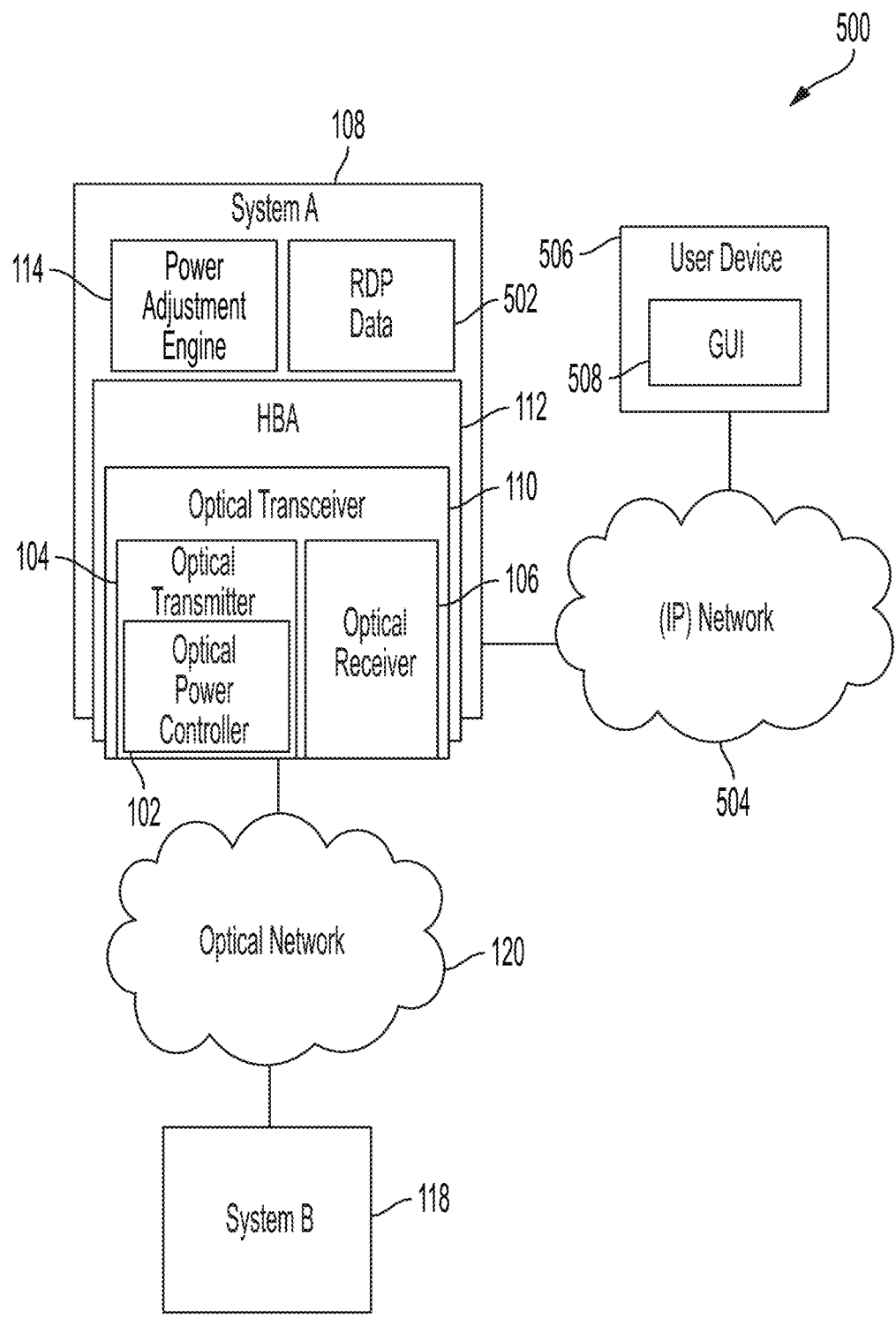
FIG. 5 depicts a block diagram of configuration that utilizes a read diagnostic parameter (RDP) function to perform transmit optical power adjustment based on receive optical power measurements according to one or more embodiments of the present invention.

Turning now to FIG. 5, a block diagram 500 of a system that utilizes RDP to perform transmit optical power adjustment based on receive optical power measurements is generally shown in accordance with one or more embodiments of the present invention. The components shown in FIG. 5 include system 108, optical network 120, system 118, network 504, and user device 506. The components of block diagram 500 of FIG. 5 are similar to those in the block diagram of FIG. 1 with the addition of user device 506 and network 504. In addition, the power management data 116 of FIG. 1 has been replaced with RDP data 502.

In accordance with one or more embodiments of the present invention, the user device 506 is coupled to the system 108 via network 504. The network 504 is shown in FIG. 5 as an Internet Protocol (IP) network which is one example of a type of network that can be implemented. Network 504 can be implemented by any type of network(s) known in the art such as, but not limited to a LAN, a WAN, TCP/IP, wireless, wired, Bluetooth, and/or PCIe.

The user device shown in FIG. 5 includes a GUI interface 508 and can be used to implement a hardware management console (HMC) that is used to manage and monitor the system 108.

As shown in the embodiment in FIG. 5 and described below in reference to FIG. 6, an RDP function can be utilized to determine the measured received optical power level of an optical recover.

Figure 6:
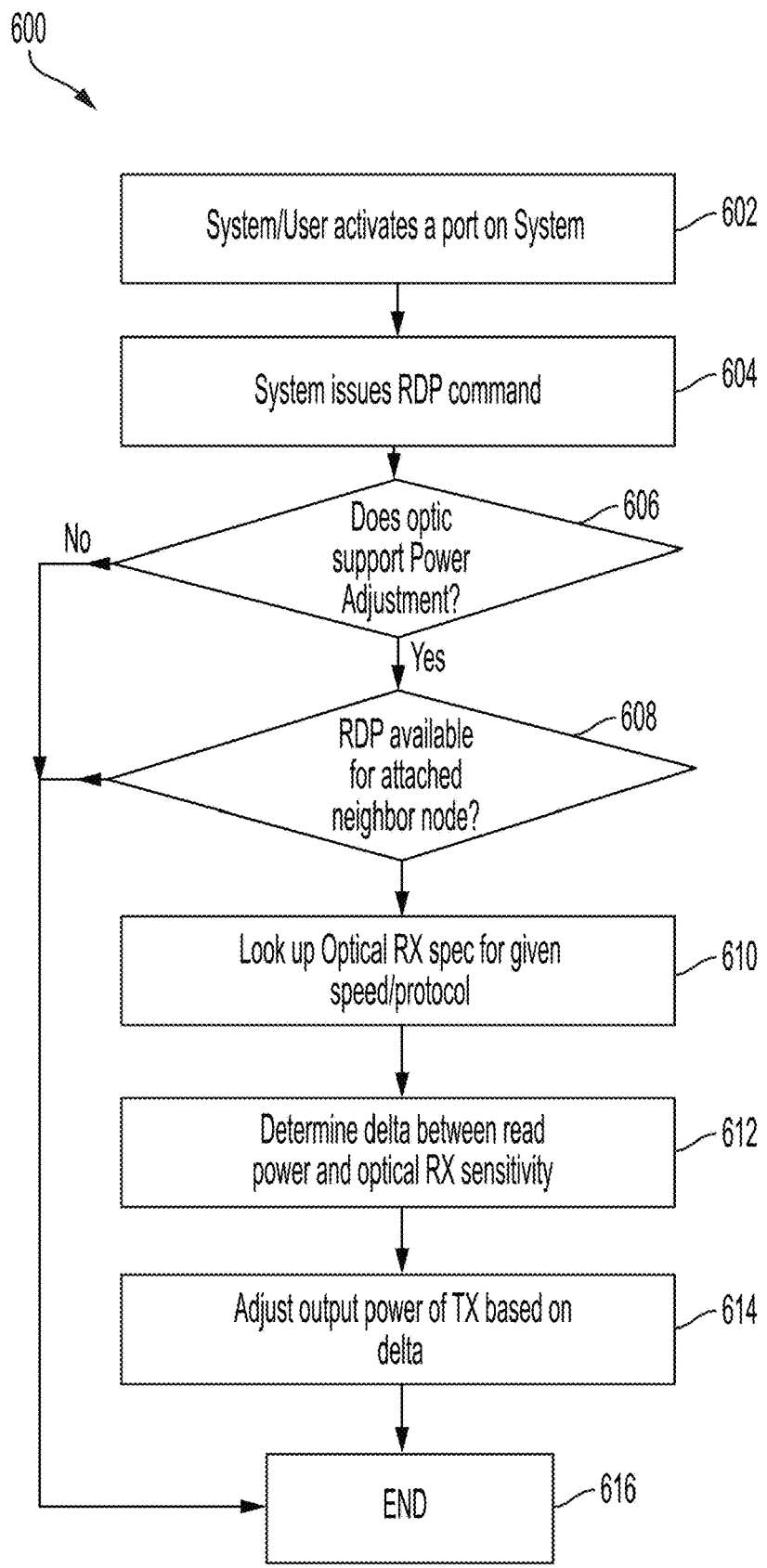
FIG. 6 depicts a flow diagram of a method that utilizes an RDP function to perform transmit optical power adjustment based on receive optical power measurements according to one or more embodiments of the present invention.

Turning now to FIG. 6, a flow diagram of a method 600 that utilizes RDP to perform optical power adjustment based on receive optical power measurements is generally shown in accordance with one or more embodiments of the present invention. All or a portion of the processing shown in FIG. 6 can be performed, for example, by power adjustment engine 114 and optical power controller 102 of FIG. 5 operating on system 108 and/or system 118 of FIG. 5.

At block 602, a port is activated on a system, such as system 108 of FIG. 5. The port can be manually activated by a user, or the port can be activated by the system for example during an initial machine load (IML) or any other boot process. In one or more other embodiments, this process can be initiated by any event type, including error recovery or a configuration change. At block 604, the system issues an RDP command for the newly initialized link. In accordance with one or more embodiments of the present invention, the system sends a neighbor node, such as system 118 in FIG. 5, an RDP extended link service (ELS) command which provides a mechanism to collect information. This collected information returned by nodes that support RDP is typically used for the diagnosis of link or port related errors or degraded conditions associated with the designate port. In a point-to-point configuration the ELS command can be addressed to the neighbor node, while in a switch configuration the ELS command can be addressed to a switch.

At block 606, it is determined whether the optical transmitter of the optical transceiver, such as optical transceiver 110 of FIG. 5, at the physical port location supports the ability to have its power adjusted. This can be determined, for example, from the vital product data (VPD) of the optical transceiver. If it is determined at block 606 that the optical transmitter does not support the ability to have its power adjusted, then processing continues at block 616 and the process ends.

If it is determined, at block 606 of FIG. 6, that the optical transmitter does support the ability to have its power adjusted, then processing continues at block 608 to determine if RDP is available for the attached neighbor node. In accordance with one or more embodiments of the present invention, the response from the RDP command sent at block 606 is used to make this determination. If the port at the neighbor node does not respond to the RDP command with an accept containing a measured receive optical power level and link speed data, then processing continues at block 616 and the process ends. If it is determined, at block 608, that the port at the neighbor node has responded to the RDP command with an accept containing a measured receive optical power level and link speed data, then processing continues at block 610. The RDP data can be stored, for example in RDP data 502 of FIG. 5.

At block 610, the optical power specifications for the link are looked up in optical power specification document such as optical power specification table 400 of FIG. 4. Aspects of the link that can impact a target received optical power level as specified in the document can include, but are not limited to the protocol, the link speed, and/or the laser type (e.g., LX, SX, LR, SR). Looking up this information at block 610 allows the system to determine the range of receive optical power levels that will work at the remote node (e.g., neighbor node). In accordance with one or more embodiments of the present invention, the optimal receive optical power level is in the middle of the receive optical power range, or sensitivity range.

At block 612, the RDP data and the optical power specifications are used to determine the difference between what the neighbor port is measuring as a receive optical power level and the optimal receive optical power level, or target receive optical power level. For example, if a port is running FICON LX at 16G, the receive optical power range should be between −11.4 dBm and +2.0 dBm. In accordance with one or more embodiments of the present invention, the optimal receive optical power level is in the middle of that range or around −4.7 dBm. If the receive optical power at the neighbor port power is read to be −3 dBm, then the delta is 1.7 dBm. Based on the threshold value being less than 1.7 dBm, the power level of the transmit optical power level of the transmitter can be adjusted at block 614. In this example, the output optical power of the transmitter can be reduced by 1.7 dBm.

In one or more embodiments of the present invention, if additional electrical power savings are required, the output optical power can be reduced so that the receive optical power level is lower than the ideal level for a given protocol and speed type. Continuing with the previous example, instead of targeting −4.7 dBm to reduce electrical power consumption by the transmitter optic, the target can be −6.7 dBm (which is still above the minimum receive optical power level.

In accordance with one or more embodiments of the present invention, the processing can also include checking if the link fails to come online and adjusting the power level until the link becomes operational.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
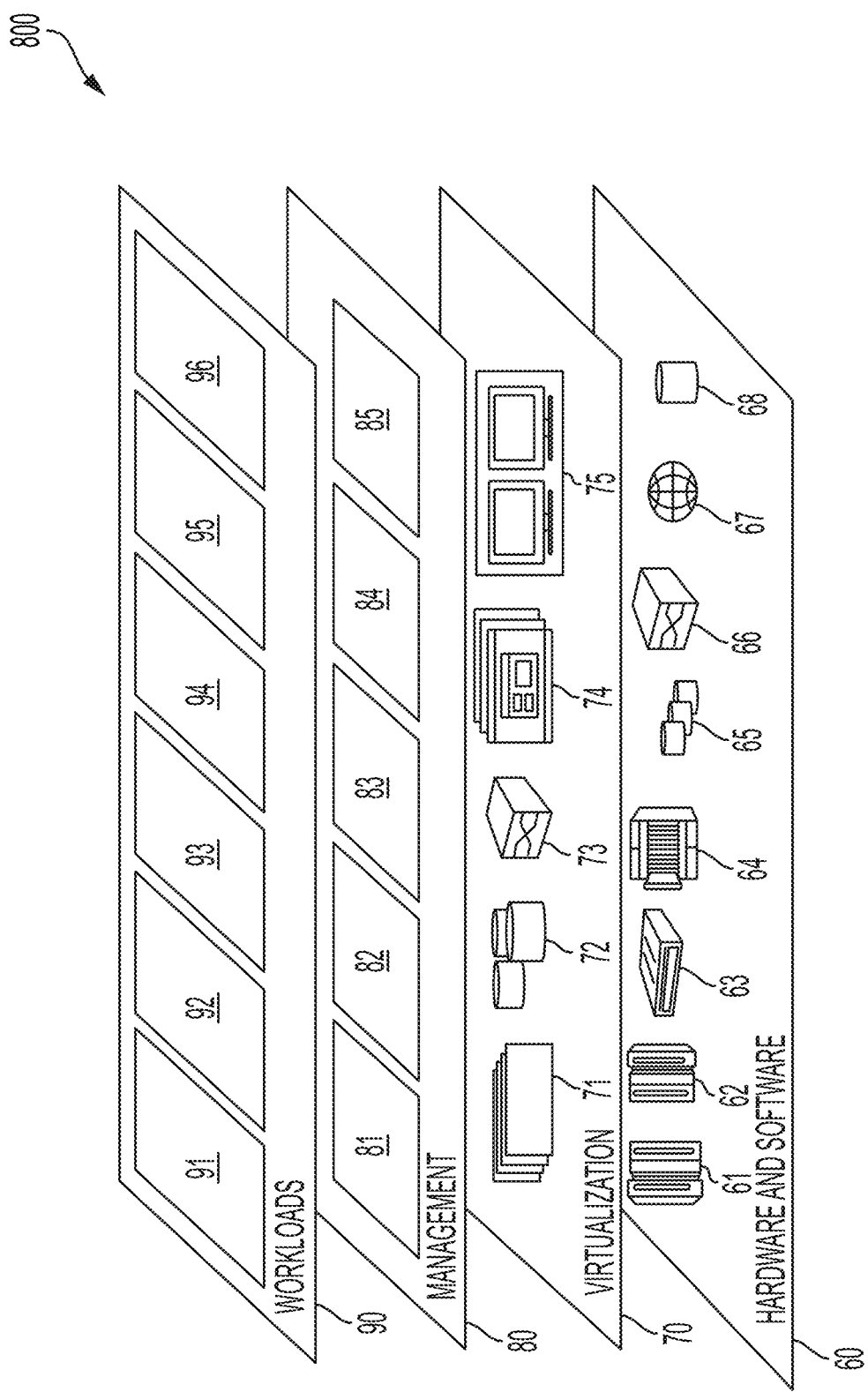
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Turning now to FIG. 9, a computer system for performing transmit optical power adjustment based on receiver measurements is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 900 therefore may include mainframe or general-purpose 901 capable of running multiple instances of an O/S simultaneously.

In one or more exemplary embodiments of the present invention, in terms of hardware architecture, as shown in FIG. 9, the computer 901 includes one or more processors 905, memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 935 may include a plurality of sub-channels configured to access the output devices 940 and 945. The sub-channels may include fiber-optic communications ports.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 a suitable operating system (OS) 911. The operating system 911 essentially controls the execution of other computer programs and provides scheduling, input-output control, file and data management, memory management, and communication control and related services.

In accordance with one or more embodiments of the present invention, the memory 910 may include multiple logical partitions (LPARs) each running an instance of an operating system. The LPARs may be managed by a hypervisor, which may be a program stored in memory 910 and executed by the processor 905.

In one or more exemplary embodiments of the present invention, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930.

In one or more exemplary embodiments of the present invention, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute instructions stored within the memory 910, to communicate data to and from the memory 910, and to generally control operations of the computer 901 pursuant to the instructions. In accordance with one or more embodiments of the present invention, computer 901 is an example of a cloud computing node 10 of FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   obtaining, by a sending system, a measured receive optical power level of an optical signal that was received at a receiving system coupled to the sending system via an optical network, the optical signal sent via an optical transmitter of the sending system to an optical receiver of the receiving system;
   determining, by the sending system, an optimal receive optical power level of the optical receiver of the receiving system, the determining comprising selecting from a plurality of alternatives; and
   adjusting, by the sending system, an output optical power level of the optical transmitter in response to determining that the measured receive optical power level is not within a threshold of the optimal receive optical power level, the adjusting performed without decoupling the sending system from the receiving system.

2. The method of claim 1, wherein the adjusting causes a next received optical power level of a next signal received at the receiving system from the sending system to be within the threshold of the optimal receive optical power level.

3. The method of claim 1, wherein the obtaining is from the receiving system.

4. The method of claim 3, wherein the method further comprises sending, by the sending system, a request to the receiving system for the measured receive optical power level, and the obtaining is responsive to the request.

5. The method of claim 1, wherein a read diagnostic parameter (RDP) function is utilized to obtain the measured receive optical power level.

6. The method of claim 1, further comprising activating a port to couple the sending system to the receiving system via the optical network, wherein the obtaining is in response to the activating.

7. The method of claim 1, wherein the obtaining and determining are repeated periodically.

8. The method of claim 1, wherein the adjusting comprises increasing or decreasing the output optical power.

9. The method of claim 1, wherein the optimal receive optical power level is specified in a document provided by a manufacturer of the optical receiver.

10. The method of claim 1, wherein the adjusting is via an application programming interface (API) of the optical transmitter.

11. The method of claim 1, wherein the optical transmitter is included in an optical transceiver.

12. The method of claim 1, wherein the optical receiver is included in an optical transceiver.

13. A system comprising:
    one or more processors for executing computer-readable instructions, the computer-readable instructions controlling the one or more processors to perform operations comprising:
      obtaining, by a sending system, a measured receive optical power level of an optical signal that was received at a receiving system coupled to the sending system via an optical network, the optical signal sent via an optical transmitter of the sending system to an optical receiver of the receiving system;
      determining, by the sending system, an optimal receive optical power level of the optical receiver of the receiving system, the determining comprising selecting from a plurality of alternatives; and
      adjusting, by the sending system, an output optical power level of the optical transmitter in response to determining that the measured receive optical power level is not within a threshold of the optimal receive optical power level, the adjusting performed without decoupling the sending system from the receiving system.

14. The system of claim 13, wherein the adjusting causes a next received optical power level of a next signal received at the receiving system from the sending system to be within the threshold of the optimal receive optical power level.

15. The system of claim 13, wherein the operations further comprise sending, by the sending system, a request to the receiving system for the measured receive optical power level, and the obtaining is responsive to the request.

16. The system of claim 13, wherein a read diagnostic parameter (RDP) function is utilized to obtain the measured receive optical power level.

17. The system of claim 13, further comprising activating a port to couple the sending system to the receiving system via the optical network, wherein the obtaining is in response to the activating.

18. The system of claim 13, wherein the obtaining and determining are repeated periodically.

19. The system of claim 13, wherein the adjusting is via an application programming interface (API) of the optical transmitter.

20. A computer program product comprising a non-transitory computer-readable storage medium having program instructions embodied therewith, the program instructions executable by one or more processors to cause the one or more processors to perform operations comprising:

one or more processors for executing computer-readable instructions, the computer-readable instructions controlling the one or more processors to perform operations comprising:

obtaining, by a sending system, a measured receive optical power level of an optical signal that was received at a receiving system coupled to the sending system via an optical network, the optical signal sent via an optical transmitter of the sending system to an optical receiver of the receiving system;

determining, by the sending system, an optimal receive optical power level of the optical receiver of the receiving system, the determining comprising selecting from a plurality of alternatives; and adjusting, by the sending system, an output optical power level of the optical transmitter in response to determining that the measured receive optical power level is not within a threshold of the optimal receive optical power level, the adjusting performed without decoupling the sending system from the receiving system.

21. The computer program product of claim 20, wherein the adjusting causes a next received optical power level of a next signal received at the receiving system from the sending system to be within the threshold of the optimal receive optical power level.

22. The computer program product of claim 20, wherein a read diagnostic parameter (RDP) function is utilized to obtain the measured receive optical power level.

23. The computer program product of claim 20, further comprising activating a port to couple the sending system to the receiving system via the optical network, wherein the obtaining is in response to the activating.

24. The computer program product of claim 20, wherein the adjusting is via an application programming interface (API) of the optical transmitter.

* * * * *